United States Patent
Lin

(10) Patent No.: US 10,964,070 B2
(45) Date of Patent: Mar. 30, 2021

(54) AUGMENTED REALITY DISPLAY METHOD OF APPLYING COLOR OF HAIR TO EYEBROWS

(71) Applicant: CAL-COMP BIG DATA, INC., New Taipei (TW)

(72) Inventor: Yung-Hsuan Lin, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 0 days.

(21) Appl. No.: 16/689,176

(22) Filed: Nov. 20, 2019

(65) Prior Publication Data
US 2020/0357178 A1 Nov. 12, 2020

(30) Foreign Application Priority Data

May 10, 2019 (CN) .......................... 201910388157.9

(51) Int. Cl.
*G06T 11/00* (2006.01)
*G06T 5/00* (2006.01)
*G06T 11/60* (2006.01)

(52) U.S. Cl.
CPC ............ *G06T 11/001* (2013.01); *G06T 5/002* (2013.01); *G06T 11/60* (2013.01); *G06T 2207/20132* (2013.01)

(58) Field of Classification Search
CPC ............................ G06T 19/006; G06T 11/001
See application file for complete search history.

(56) References Cited

U.S. PATENT DOCUMENTS

| 5,850,463 A * | 12/1998 | Horii | G06T 17/00 382/118 |
| 6,862,374 B1 * | 3/2005 | Nagai | G06T 17/00 345/419 |
| 2014/0210754 A1 * | 7/2014 | Ryu | G06F 1/1694 345/173 |

(Continued)

OTHER PUBLICATIONS

Jisoo Park et al: "An Automatic Virtual Makeup Scheme Based on Personal Color Analysis", Ubiquitous Information Management and Communication, ACM, 2 Penn Plaza, Suite 701New YorkNY10121-0701USA, Jan. 5, 2018, pp. 1-7, XP058407756, DOI: 10.1145/3164541.3164612, ISBN: 978-1-4503-6385-3.

(Continued)

*Primary Examiner* — Phi Hoang
(74) *Attorney, Agent, or Firm* — Chun-Ming Shih; HDLS IPR Services

(57) ABSTRACT

An augmented reality display method of applying color of hair to eyebrows includes the steps of capturing a head image (30) of a user (2), retrieving an original eyebrow image from the head image (30), extracting a hair representation image (31) covering at least part of the user's hair from the head image (30), executing a process of extracting hair region on the hair representation image (31) for obtaining a hair mask for indicating hair's position, computing a hair color parameter according to the hair mask and the hair representation image (31), executing a process of coloring eyebrows on the head image (30) according to the hair color parameter and position of the original eyebrow image for obtaining an AR (Augmented Reality) head image which its eyebrow color corresponds to the hair color parameter, and displaying the AR head image.

20 Claims, 11 Drawing Sheets

(56) References Cited

U.S. PATENT DOCUMENTS

2015/0248581 A1* 9/2015 Gouda ................. G06T 19/006
                                                      345/633
2018/0276883 A1* 9/2018 D'Alessandro ......... G06T 17/20
2019/0004688 A1* 1/2019 Bowen .................. G06F 40/186

OTHER PUBLICATIONS

Search Report dated May 29, 2020 of the corresponding European patent application.

* cited by examiner

AUGMENTED REALITY DISPLAY METHOD OF APPLYING COLOR OF HAIR TO EYEBROWS

BACKGROUND OF THE INVENTION

Field of the Invention

The technical field relates to an augmented reality display method, and more particularly related to an augmented reality display method of applying color of hair to eyebrows.

Description of Related Art

Although a natural hair color of people is similar to a natural eyebrow color, there is a big contrast between a hair color after dyeing and the natural eyebrow color when people's hair is dyed such it looks very unnatural that the appearance with the specific hair color after dyeing (such as silver) and the natural eyebrow color (such as black).

To solve the problem described above, people needing to make up may change his/her eyebrow color by brow makeup, so as to make an eyebrow color after brow makeup is similar to the hair color after dyeing.

However, it doesn't always look natural that the appearance with the hair color after dyeing and the eyebrow color being similar to the hair color after dyeing. In some cases, instead of appearing an effect expected by the people, the appearance has the eyebrow color after brow makeup and the hair color after dyeing which are similar to each other. More specifically, people needed to make up usually find the above situation after makeup, such that there is a waste of time and cosmetics for makeup.

Moreover, the current technology of image analysis directly recognizes a hair position in the whole head image and retrieve the hair color when the execution of hair color analysis. However, it is very easy to have interference from a variation of light and shadow and cause a misjudgment of the hair position during hair color analysis by the current technology of image analysis because there are a lot of gaps between the hairlines and the complex variation of light and shadow caused by the gaps. The above problem makes the current technology of image analysis retrieve the incorrect hair color.

Accordingly, there is currently a need for technology having the ability to retrieve the correct hair color correctly and provide the people an augmented reality (AR) image of applying his/her hair color to his/her eyebrows as a reference before the brown makeup.

SUMMARY OF THE INVENTION

The technical field relates to an augmented reality display method of applying color of hair to eyebrows having the ability to recognize the correct hair color and show the augmented reality effect of applying the hair color to eyebrows.

One of the exemplary embodiments, an augmented reality display method of applying color of hair to eyebrows is disclosed, the method is applied to a smart mirror apparatus comprising an image capture module, a display module, and a processing unit, the method comprises following steps of a) capturing a head image of a user by the image capture module; cropping the head image for obtaining an original eyebrow image by the processing unit; cropping the head image for obtaining a hair representation image, wherein the hair representation image only covering partial hair of the user; executing a process of extracting hair region on the hair representation image for obtaining a hair mask, wherein the hair mask indicates a hair position of the hair in the hair representation image; computing a hair color parameter according to the hair mask and the hair representation image; executing a process of coloring eyebrows on the head image according to the hair color parameter and a position of the original eyebrow image for obtaining an AR (Augmented Reality) head image, wherein an eyebrow color of the AR head image corresponds to the hair color parameter; and, displaying the AR head image by the display module.

The present disclosed example can effectively recognize the correct hair color, and effectively show the appearance after the brown makeup according to the hair color of the user as a reference of brown makeup for the user.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to some exemplary embodiments, being not used to limit its executing scope. Any equivalent variation and modification made according to appended claims is all covered by the claims claimed by the present disclosed example.

Figure 1:
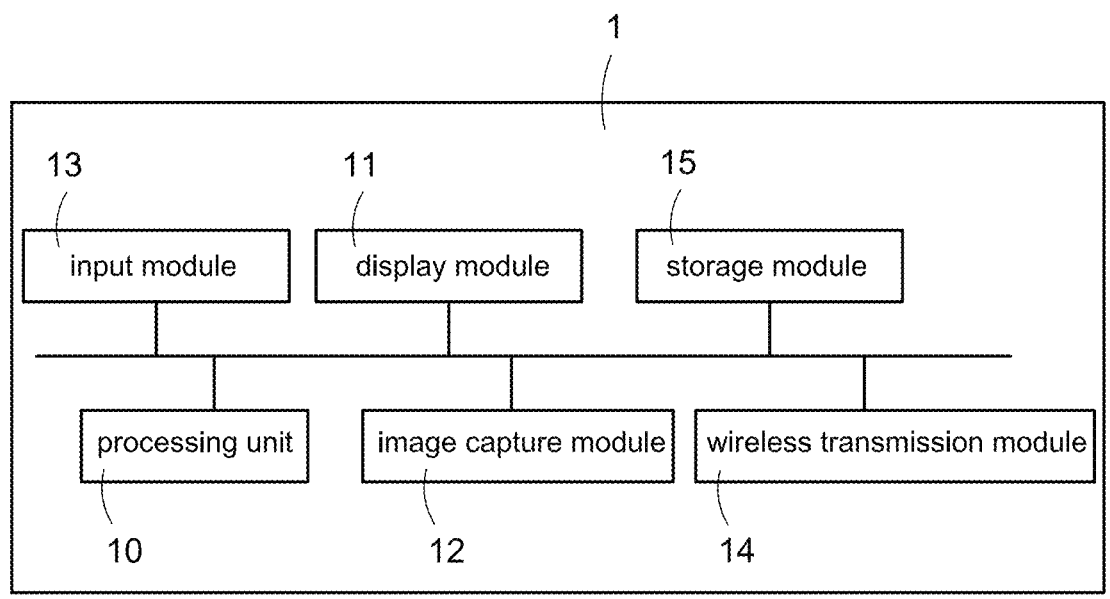
FIG. 1 is an architecture diagram of a smart mirror apparatus according to one embodiment of the present disclosed example.
Figure 2:
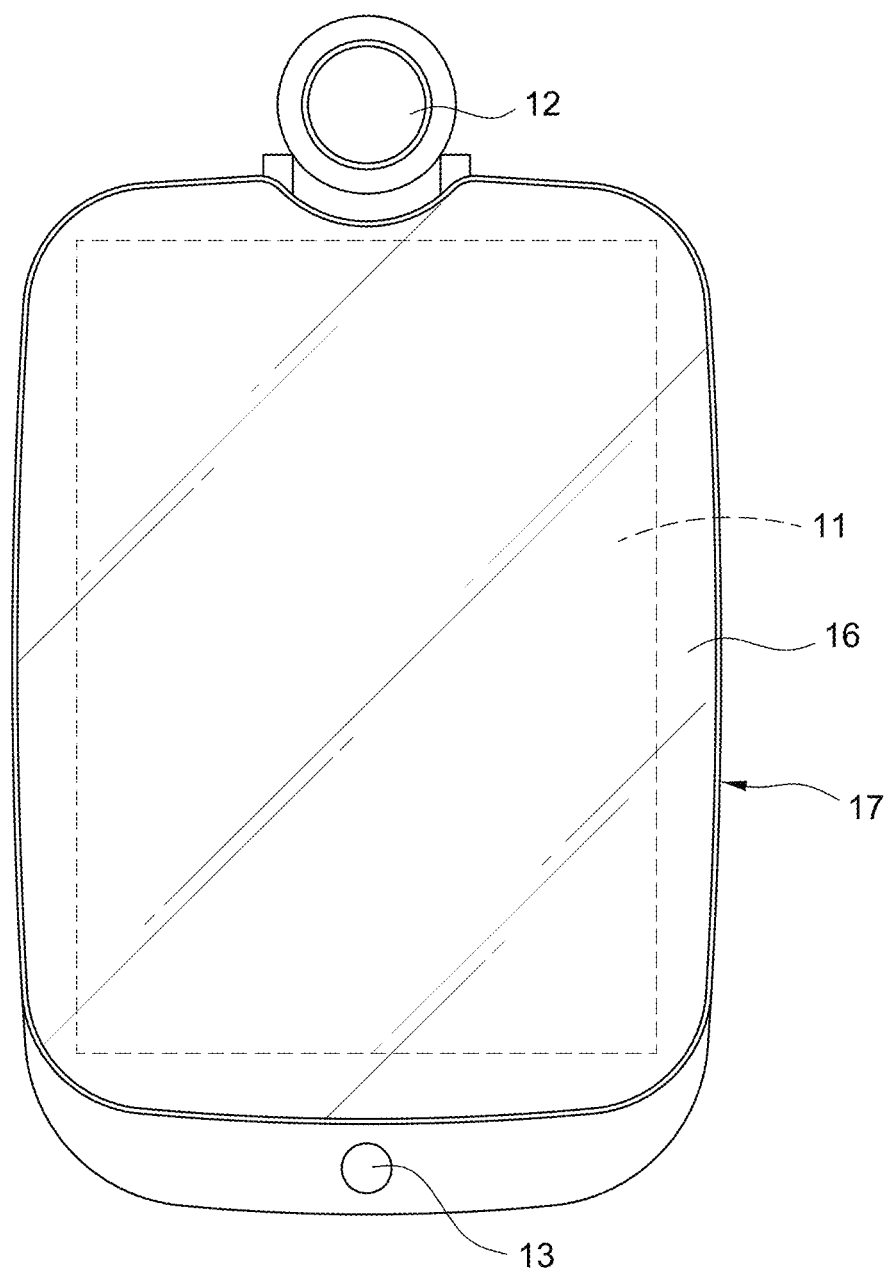
FIG. 2 is a schematic view of an appearance of a smart mirror apparatus according to one embodiment of the present disclosed example.

Please refer to FIG. 1 and FIG. 2 together. FIG. 1 is an architecture diagram of a smart mirror apparatus according to one embodiment of the present disclosed example, and FIG. 2 is a schematic view of an appearance of a smart mirror apparatus according to one embodiment of the present disclosed example.

The present disclosed example discloses a smart mirror apparatus 1, the smart mirror apparatus 1 is mainly applied to an augmented reality display method of applying color of hair to eyebrows (referred to as the display method of applying color in the following description), the display method of applying color has an ability to automatically recognize the correct hair color of the user, generate and display an augmented reality image of applying the correct hair color to the eyebrows.

Please be noted that the current technology of image analysis that directly retrieving the hair color in the whole head image when the execution of hair color analysis is easy to misjudge.

To solve the above problem, the present disclosed example discloses a technology having novelty and inventive step. This technology is to crop a part of the head image being most representative of hair (namely the hair representation image described later), compute a hair mask for indicating a hair position, and applying the hair mask to the hair representation image to obtain a correct position of hair for detecting a correct hair color. Thus, the present disclosed example can obtain the most correct hair color.

As shown in FIG. 1, the smart mirror apparatus 1 of the present disclosed example mainly comprises a processing unit 10, a display module 11, an image capture module 12, an input module 13, a wireless transmission module 14 and a storage module 15. The processing unit 10, the display module 11, the image capture module 12, the input module 13, the wireless transmission module 14 and the storage module 15 are electrically connected to each other by at least one bus.

The display module 11 (such as color LCD monitor) is used to display information. The image capture module 12 (such as camera) is used to capture the external images. The input module 13 (such as buttons or touch pad) is used to receive the user's operation. The wireless transmission module 14 (such as Wi-Fi module, Bluetooth module or mobile network module, etc.) is used to connect to the network. The storage module 15 is used to store data. The processing unit 10 is used to control each module of the smart mirror apparatus 1 to operate. One of the exemplary embodiments, the storage module 15 may comprise a non-transient storage media, the non-transient storage media stores a computer program (such as firmware, operating system, application program or any combination of the above program of the smart mirror apparatus 1), the computer program records a plurality of corresponding computer-executable codes. The processing unit 10 may further implement the method of each embodiment of the present disclosed example via the execution of the computer-executable codes.

One of the exemplary embodiments, the smart mirror apparatus 1, such as a smartphone, a tablet, or an electronic signboard with a camera function, only has the ability to provide an electronic mirror function. More specifically, the image capture module 12 and the display module 11 are installed on the same side of the smart mirror apparatus 1, so as to make the user be captured and watch the display module 11 simultaneously. The smart mirror apparatus 1 may capture the external images (such as the facial image of the user) continuously by the image capture module 12 after the execution of the computer program (such as an application program), execute the selectable process(es) on the captured images optionally, and display the captured (and processed) images by the display module 11 instantly. Thus, the user may see own electronic mirror in the display module 11.

Figure 6:
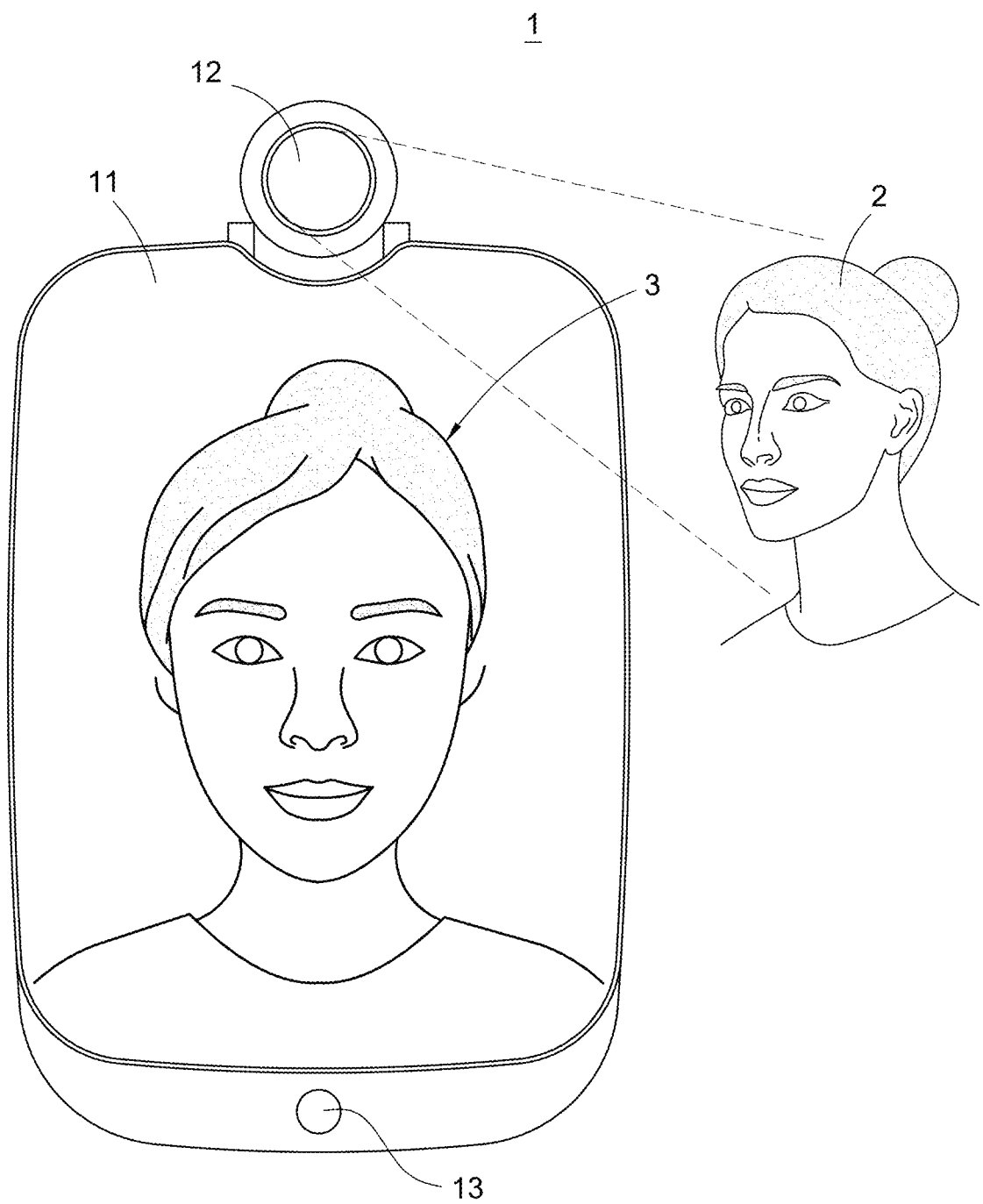
FIG. 6 is a usage schematic view of a smart mirror apparatus according to one embodiment of the present disclosed example.

One of the exemplary embodiments, the smart mirror apparatus 1 may implement an optical mirror function and an electronic mirror function simultaneously. More specifically, please refer to FIG. 1, FIG. 2 and FIG. 6 together. FIG. 6 is a usage schematic view of a smart mirror apparatus according to one embodiment of the present disclosed example.

As shown in FIG. 2 the smart mirror apparatus 1 may further comprise a mirror glass 16 (such as the unidirectional glass) and a housing 17. The display module 11 is arranged in the housing 17 and on the rear of the mirror glass 16. Namely, the user cannot discover the existence of the display module 11 directly. Moreover, the image capture module 12 is arranged upon the mirror glass 16. The input module 13 comprises at least one physical button arranged on the front side of the smart mirror apparatus 1, but this specific example is not intended to limit the scope of the present disclosed example.

In this embodiment, when there is a need to implement the optical mirror function, the processing unit 10 turns the display module 11 off to make a luminance of the front side of the mirror glass 16 (namely, the side which the user is located) is brighter than a luminance of the backside of the mirror glass 16 (namely, the side which the display module 11 is arranged). Thus, the smart mirror apparatus 1 may be as a simple optical mirror and display the user's optical mirror image by reflection.

Furthermore, during implementing the optical mirror function, the processing unit 10 may control the display module 11 to display the additional information (such as weather information, date information, graphical user interface or the other information) in the designated region, such as the edge of the mirror glass 16 or the other region having a lower probability of overlapping the mirror image 3.

When there is a need to implement the electronic mirror function, the processing unit 10 may control the image capture module 12 to capture the user 2 in front of the smart mirror apparatus 1 continuously for generating the front mirror image comprising the image of the user 2 continuously, execute the process(es) on the captured front mirror images optionally (such as image correction, adding the additional information, and so on), turn the display module 11 on and control the display module 11 to display the processed images in real-time or near-real-time. Because of the luminance of the front side of the mirror glass 16 (namely, the side which the user 2 is located) is darker than the luminance of the back side of the mirror glass 16

(namely, the side which the display module 11 is arranged), the user may see own electronic mirror image 3 displayed in the mirror glass 16.

Please be noted that the image capture module 12 is arranged upon the mirror glass 16, but this specific example is not intended to limit the scope of the present disclosed example. The image capture module 12 may be arranged in any position of the smart mirror apparatus 1 according to the product demand, such as being arranged behind the mirror glass 16 for reducing the probability of the image capture module 12 being destroyed and making the appearance simple.

Figure 3:
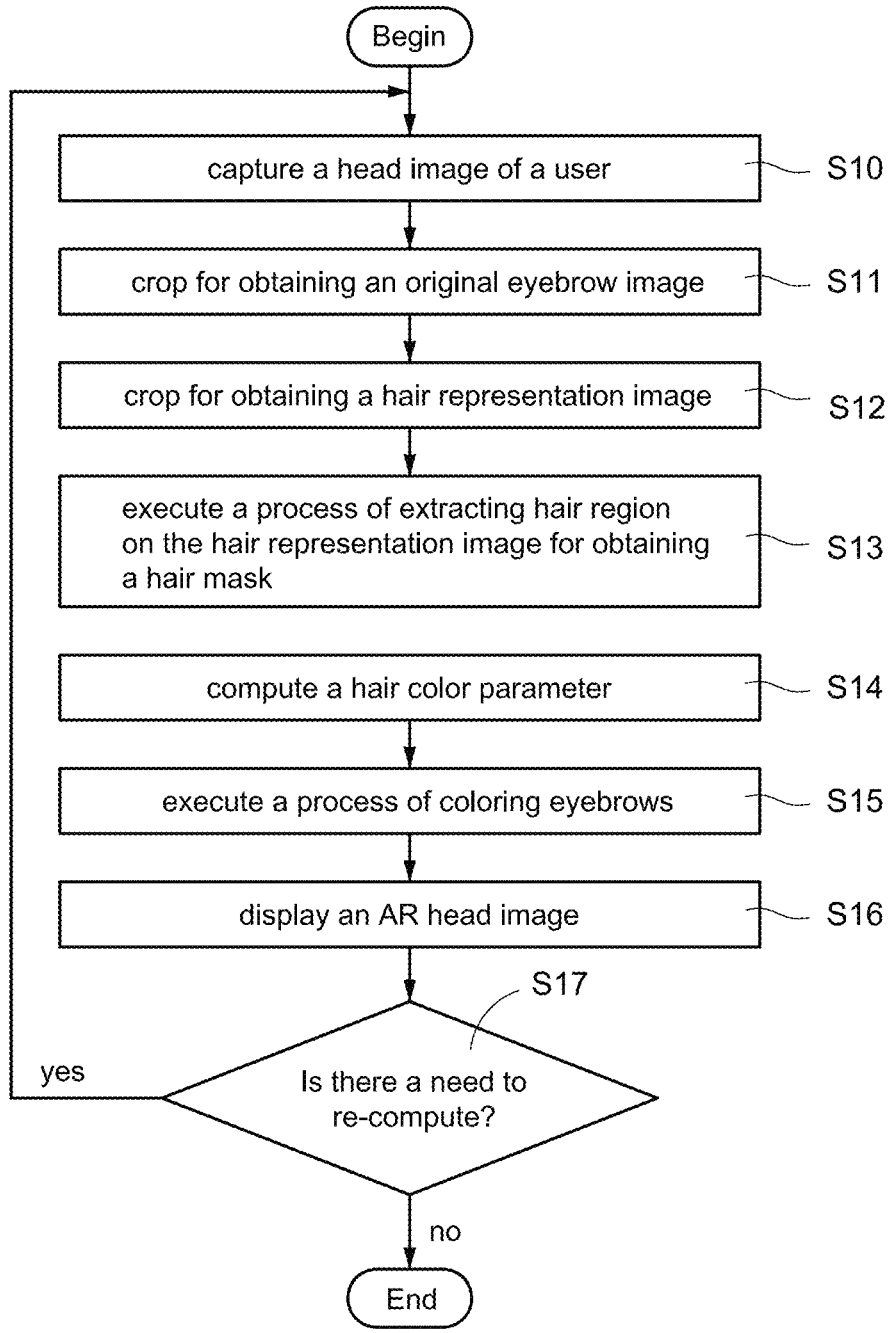
FIG. 3 is a flowchart of an augmented reality display method of applying color of hair to eyebrows of a first embodiment of the present disclosed example.

Please refer to FIG. 3, which is a flowchart of an augmented reality display method of applying color of hair to eyebrows of a first embodiment of the present disclosed example. The display method of applying color of each embodiment of the present disclosed example may be implemented by the smart mirror apparatus shown in FIG. 1 and FIG. 2. The display method of applying color of this embodiment mainly comprises following steps.

Step S10: the processing unit 10 controls the image capture module 12 to capture a user for capturing a head image of the user.

One of the exemplary embodiments, the processing unit 10 captures the user's head image when detection of the user is located in front of the smart mirror apparatus 1. More specifically, the processing unit 10 is configured to control the image capture module 12 to capture toward the front side of the mirror glass 16 continuously for continuously obtaining the front mirror images with a wider field of view and continuously executing detection on the front mirror images for determining whether there is any human being captured. The processing unit 10 may be configured to not execute the designated process on the front mirror image for saving the computing resource and preventing the redundant process from execution when there is no human being captured. When determining that someone is captured, the processing unit 10 may be configured to execute the recognition of facial position on the front mirror image (such as the half body image of the user), and crop the front mirror image into a facial image with a narrower field of view.

One of the exemplary embodiments, the processing unit 10 is configured to control the image capture module 12 to capture the human's head directly for obtaining the user's head image, so as to omit the additional image-cropping process and obtain the head image with a higher resolution.

Step S11: the processing unit 10 crops an original eyebrow image out from the head image. More specifically, the processing unit 10 executes a process of recognizing eyebrows on the head image for recognizing a position and a range of an eyebrow image, and crops the eyebrow image being recognized out from the head image.

Step S12: the processing unit 10 crops a hair representation image out from the head image, the above hair representation image only covering partial hair of the user.

More specifically, the whole head image comprises a lot of non-hair images, such as forehead image, nose image, eyebrow image, background image and so on. The effectiveness of executing the analysis process of hair will be reduced caused by the amount of information being too large if the execution of the hair analysis process described later on those non-hair images. Moreover, those non-hair images will become the noises during the execution of the analysis process of hair and increase the error rate of the analysis process of hair.

One of the exemplary embodiments, a range of the hair representation image being cropped may be a fixed range (such as the upper half of the head image) or a dynamic range changed with the user (such as cropping the image located upon the user's forehead from the head image).

Please be noted that because one of the main purposes of the present disclosed example is to recognize the correct hair color of the user, the present disclosed example only needs to crop the hair representation image having the ability to show the most correct hair color (such as the image located at a position of most dense hair or having the highest probability of existence of hair), it is not necessary to recognize the positions of all hair.

Thus, the present disclosed example can effectively improve the effectiveness of the analysis process of hair and reduce the misjudgment rate.

Step S13: the processing unit 10 executes a process of extracting hair region on the hair representation image for obtaining a hair mask. The hair mask indicates a hair position of the hair in the hair representation image.

Please be noted that the masks in the present disclosed example (such as the above-mentioned hair mask or the eyebrow mask described later) are respectively used to indicate the positions of the designated portions (such as hair or eyebrows). For example, the mask may be used to crop an image of a designated part (such as hair) from the designated image (such as the above-mentioned hair representation image) when applying to the image-cropping; the mask may be used to make only the position of the part designated by the mask be synthesized when applying to the image synthesis (such as executing a color-mixing process on the head image described later).

Step S14: the processing unit 10 computes a hair color parameter according to the hair mask being obtained and the hair representation image being cropped.

One of the exemplary embodiments, the processing unit 10 applies the hair mask to the hair representation image to obtain the hair image, and executes a color analysis on the hair image to obtain the hair color parameter.

One of the exemplary embodiments, the hair color parameter may be values in RGB color space, values in HSL color space, values in CMYK color space or the coordinate values in the other color spaces.

Step S15: the processing unit 10 executes a process of coloring eyebrows on the head image according to the hair color parameter and a position of the original eyebrow image to obtain an augmented reality (AR) head image. An eyebrow color of the above-mentioned AR head image corresponds to the hair color parameter.

One of the exemplary embodiments, the processing unit 10 is configured to select a color corresponding to the hair color parameter, and apply this color to an eyebrow region of the head image.

Step S16: the processing unit 10 displays the AR head image by the display module 11.

Step S17: the processing unit 10 determines whether there is a need to recompute the AR head image.

For example, the processing unit 10 may determine whether a default recomputation condition is fulfilled, such as it being detected that the user moves head, a default time elapsing, change of the current user having taken, a command of recomputation being inputted by the user and so on, and perform the step S10 again to recompute the AR head image when satisfying the recomputation condition.

Otherwise, the processing unit finishes the execution of the display method of applying color.

One of the exemplary embodiments, when detecting that the user moves his/her head (such as the head position or the head orientation changing), the processing unit 10 does not recompute, and adjust the display of the AR head image according to the variation amount of the head position or the head orientation. Thus, the present disclosed example can drastically reduce computation and improve system performance.

One of the exemplary embodiments, the processing unit 10 recomputes when detecting that the variation amount of the head position or the head orientation is greater than a default value.

The present disclosed example can effectively recognize the correct hair color, and effectively show the appearance after the brown makeup according to the hair color of the user as a reference of brown makeup for the user.

Figure 4A:
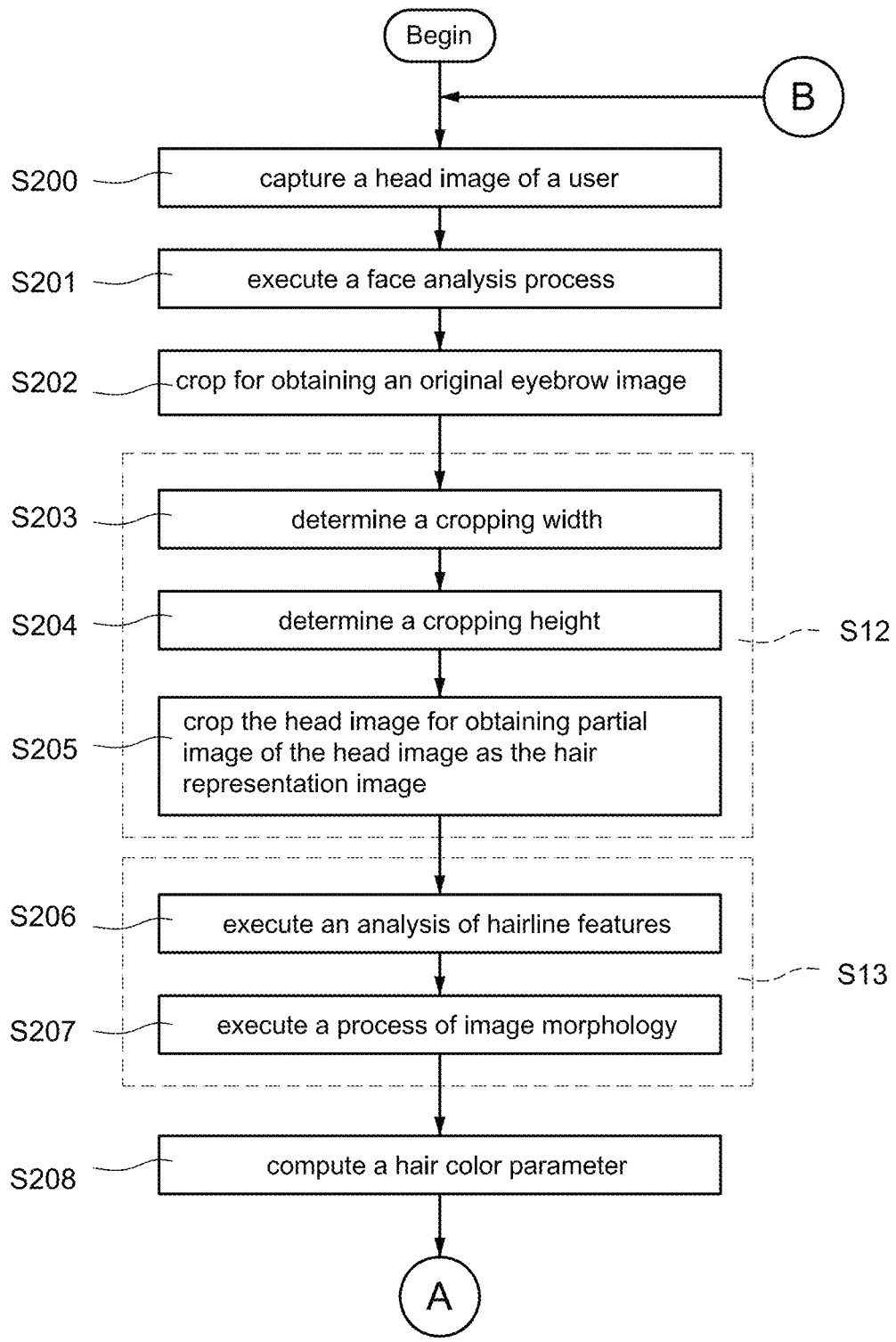
FIG. 4A is a first part of flowchart of an augmented reality display method of applying color of hair to eyebrows of a second embodiment of the present disclosed example.
Figure 4B:
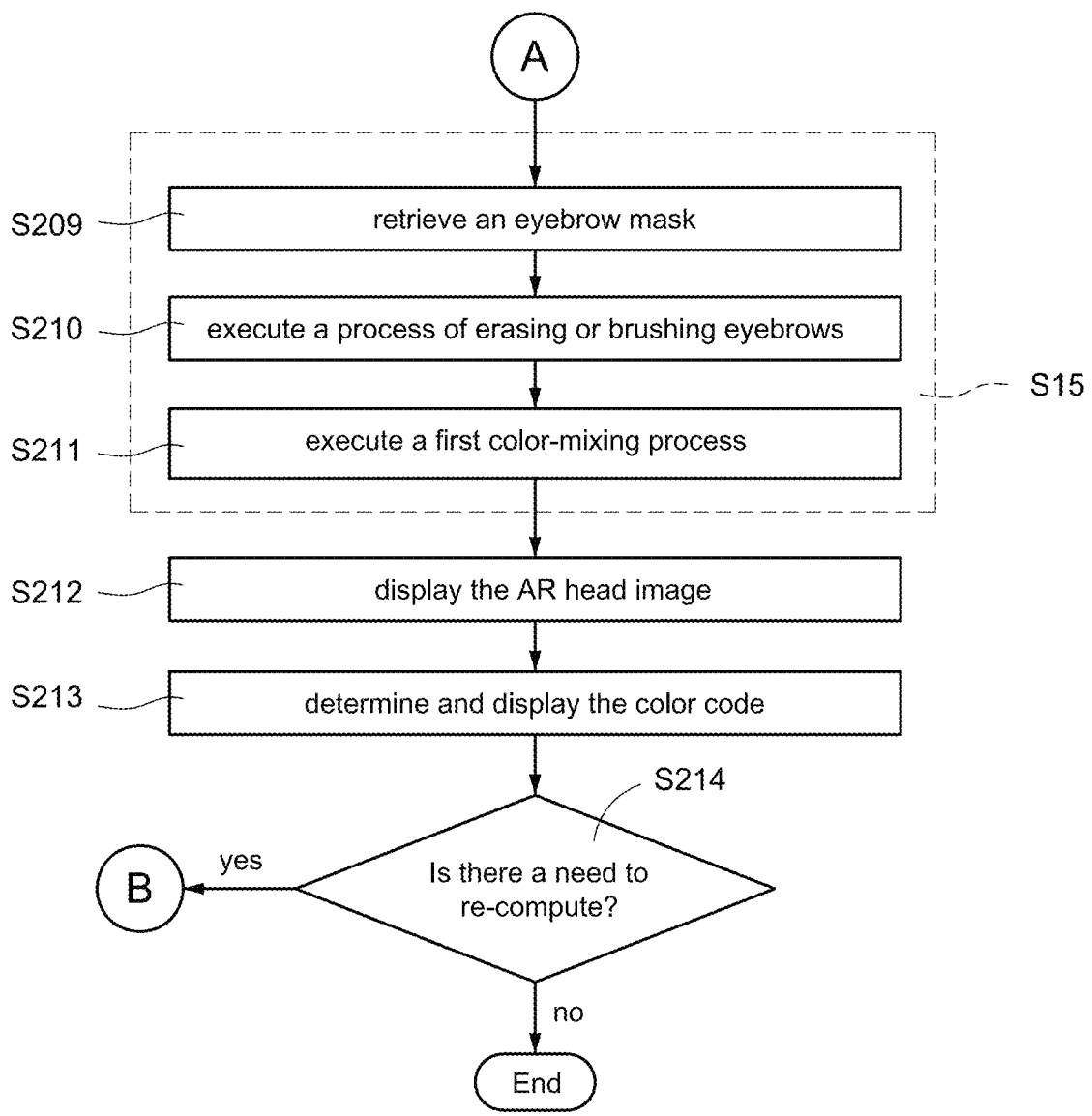
FIG. 4B is a second part of flowchart of an augmented reality display method of applying color of hair to eyebrows of a second embodiment of the present disclosed example.
Figure 7:
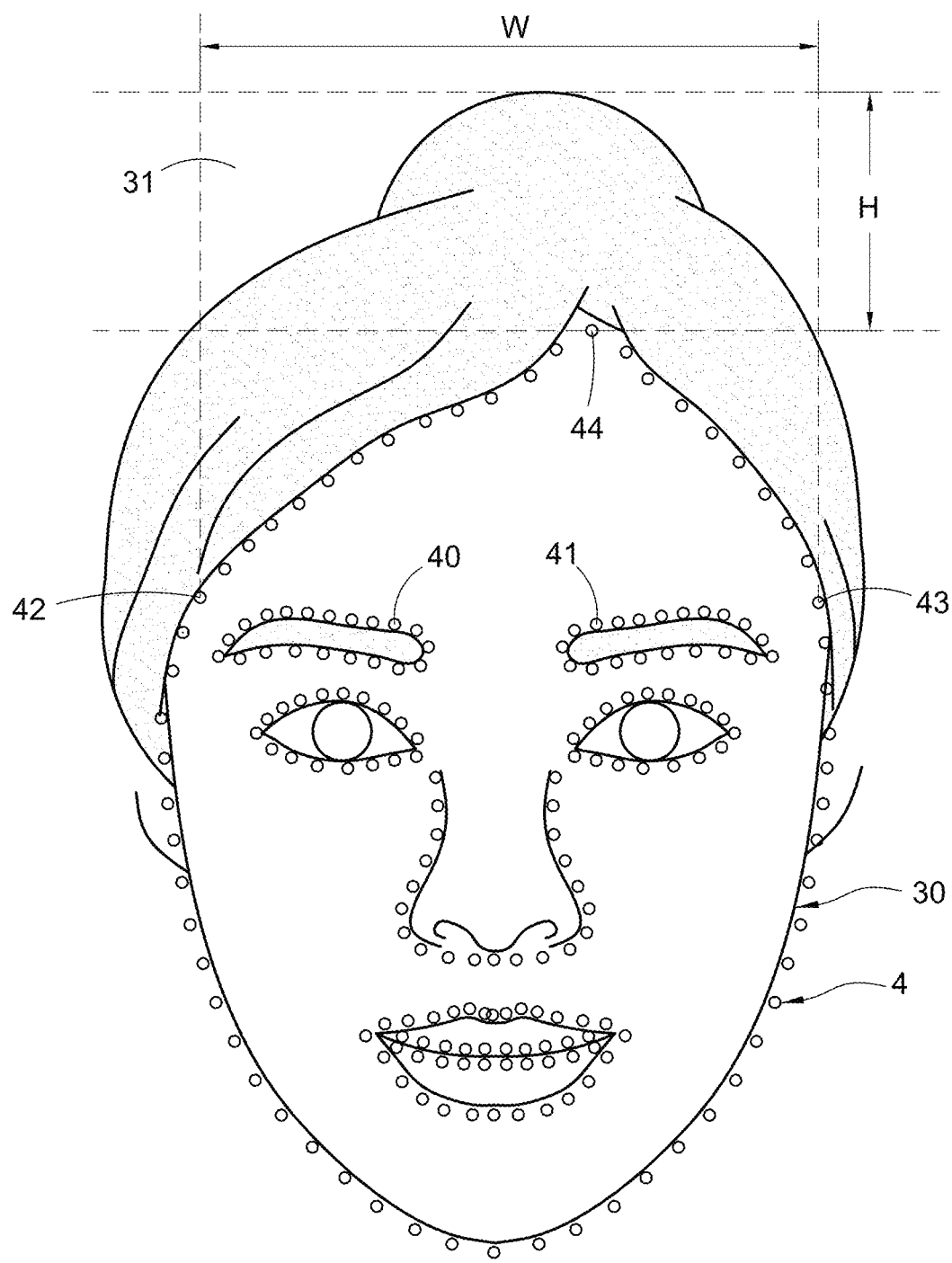
FIG. 7 is a schematic view of a face analysis process according to one embodiment of the present disclosed example.
Figure 8A:
FIG. 8A is a schematic view of the partial hair representation image according to one embodiment of the present disclosed example.
Figure 8D:
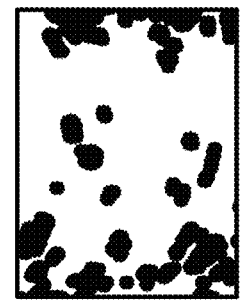
FIG. 8D is a schematic view of an execution result of a closing operation on the image shown in FIG. 8C.
Figure 8B:
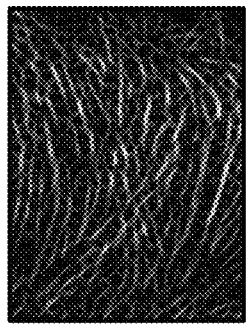
FIG. 8B is a schematic view of an execution result of an analysis of hairline features on the image shown in FIG. 8A.
Figure 8E:
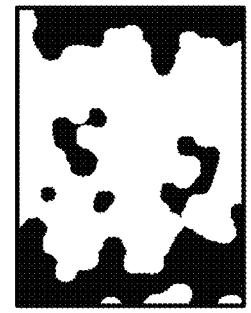
FIG. 8E is a schematic view of an execution result of an opening operation on the image shown in FIG. 8D.
Figure 8C:
FIG. 8C is a schematic view of an execution result of a binarization process of brightness division on the image shown in FIG. 8B.
Figure 8F:
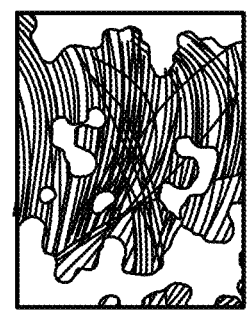
FIG. 8F is a schematic view of an execution result of applying the hair mask shown in FIG. 8E to the hair image.
Figure 9:
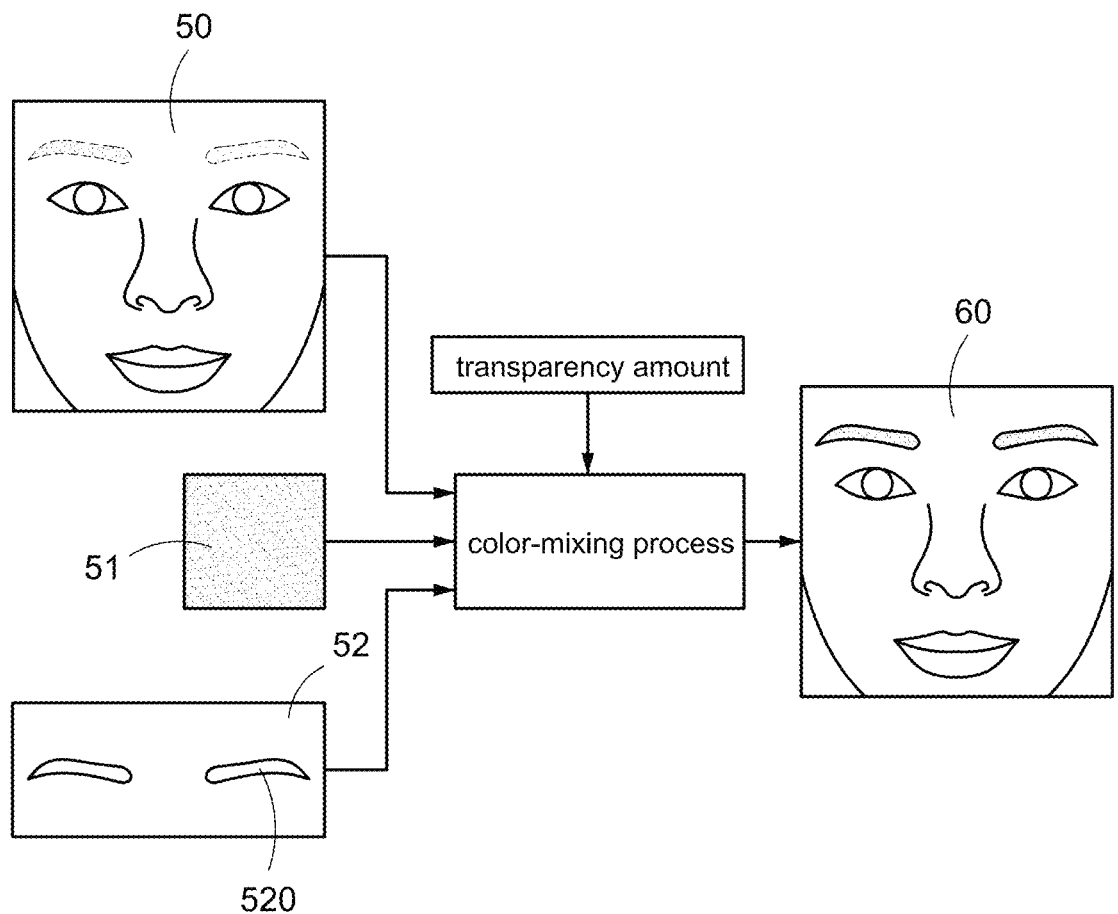
FIG. 9 is a schematic view of a first color-mixing process according to one embodiment of the present disclosed example.

Please refer to FIG. 4A, FIG. 4B, FIG. 7, FIG. 8A to 8F, and FIG. 9 together. FIG. 4A is a first part of flowchart of an augmented reality display method of applying color of hair to eyebrows of a second embodiment of the present disclosed example, FIG. 4B is a second part of flowchart of an augmented reality display method of applying color of hair to eyebrows of a second embodiment of the present disclosed example, FIG. 7 is a schematic view of a face analysis process according to one embodiment of the present disclosed example, FIG. 8A is a schematic view of the partial hair representation image according to one embodiment of the present disclosed example, FIG. 8B is a schematic view of an execution result of an analysis of hairline features on the image shown in FIG. 8A, FIG. 8C is a schematic view of an execution result of a binarization process of brightness division on the image shown in FIG. 8B, FIG. 8D is a schematic view of an execution result of a closing operation on the image shown in FIG. 8C, FIG. 8E is a schematic view of an execution result of an opening operation on the image shown in FIG. 8D, FIG. 8F is a schematic view of an execution result of applying the hair mask shown in FIG. 8E to the hair image, and FIG. 9 is a schematic view of a first color-mixing process according to one embodiment of the present disclosed example; and.

Compare to the display method of applying color shown in FIG. 3, in this embodiment, the step S12 may comprise steps S203-S205, the step S13 may comprise steps S206-S207, and the step S15 may comprises steps S209-S211. The display method of applying color of this embodiment comprises following steps.

Step S200: the processing unit 10 retrieves the head image of the user. One of the exemplary embodiments, the processing unit 10 may control the image capture module 12 to capture toward the user to obtain the complete front mirror image which may comprise an image of the upper body of the user and an image of background, and execute a head recognition process on the front mirror image being captured to crop the head image of the user. For example, the processing unit 10 may execute a face recognition process on the front mirror image to obtain a facial image of the user, and expand the facial image for a default size (such as default number of pixels) to obtain the head image.

Step S201: the processing unit 10 execute a face analysis process on the head image to recognize a plurality of eyebrow feature point corresponding to the eyebrows of the user in the head image.

One of the exemplary embodiments, the above-mentioned face analysis process is configured to analyze the head image 30 via execution of the Face Landmark Algorithm for determining a position of the specific part of the face in the head image 30, but this specific example is not intended to limit the scope of the present disclosed example. Furthermore, the above-mentioned Face Landmark Algorithm is implemented by the Dlib Library.

Please refer to FIG. 7, during execution of the face analysis process, the processing unit 10 first analyzes the head image 30 via execution of the above-mentioned Face Landmark Algorithm. The above-mentioned Face Landmark Algorithm is a common technology in the art of the present disclosed example. The Face Landmark Algorithm is used to analyze the face in the head image 30 based on Machine Learning technology for recognizing a plurality of feature points 4 (such as eyebrow peak and eyebrow head, eye tail and eye-head, nose bridge and nose wind, pinna and earlobe, and so forth, the number of the feature points 4 may be 68 or 198) of one or more specific part(s) (such as eyebrows, eyes, nose or ears) of the face. Moreover, the above-mentioned Face Landmark Algorithm may further mark a plurality of marks of the feature points 4 of the specific part(s) on the head image 30.

One of the exemplary embodiments, the processing unit 10 may number each feature point 4 according to the part which the feature point 4 belongs and/or the feature which the feature point corresponds.

Thus, the present disclosed example can determine the position of each part of the head image 30 according to the information of numbers, shapes, sorts and so forth of the feature points 4.

One of the exemplary embodiments, the processing unit 10 recognizes a plurality of eyebrow feature points 40 and 41 respectively corresponding to the left eyebrow and the right eyebrow (the eyebrow image) in the head image 30.

One of the exemplary embodiments, the processing unit 10 further recognizes a plurality of forehead feature points 42-44 corresponding to a forehead of the user in the head image 30.

Step S202: the processing unit 10 crops the eyebrow image of the left eyebrow and the right eyebrow according to the positions of the plurality of eyebrow feature points 40 and 41.

Step S203: the processing unit 10 determine a cropping width W according to the plurality of forehead feature points 42-44. One of the exemplary embodiments, the processing unit 10 configures a face width as the cropping width W. More specifically, the processing unit 10 selects the forehead feature points 42 and 43 being closest to both sides of the face contour in the forehead, and computes a horizontal distance between the forehead feature points 42 and 43 being selected as the above-mentioned cropping width W.

One of the exemplary embodiments, the processing unit 10 configures a default width as the cropping width W, the above default width may be a static width (such as 20 centimeters or 1000 pixels) or a dynamic width determined by the parameter of the current user (such as the height or the eyebrow distance of the user).

Step S204: the processing unit 10 determine a cropping height H according to the forehead feature point 44 being the highest and a hair apex point.

One of the exemplary embodiments, the processing unit 10 computes a vertical distance between the forehead feature point 44 being the highest and an upper boundary of the head image 30, and configures the vertical distance as the cropping height H.

One of the exemplary embodiments, the processing unit 10 recognizes the highest point of the hair, computes the vertical distance between the highest point of the hair and the forehead feature point 44 being the highest, and configures the vertical distance as the cropping height H.

One of the exemplary embodiments, the processing unit 10 configures a default height as the cropping height H, the above default height may be a static height (such as 10 centimeters or 500 pixels) or a dynamic height determined by the parameter of the current user (such as the height or the facial length of the user).

Step S205: the processing unit 10 crops a part of the head image (such as the region surrounded by a dotted line shown in FIG. 7) according to a position of the forehead feature point 44 being the highest, the cropping width W and the cropping height H.

One of the exemplary embodiments, the hair representation image cropped by the processing unit 10 has the cropping height H and the cropping width W.

One of the exemplary embodiments, after the region surrounded by the dotted line shown in FIG. 7 is captured, the processing unit 10 further crops the region surrounded by the dotted line, and configures a part of the region surrounded by the dotted line as the hair representation image (as the example shown in FIG. 8A). Namely, the hair representation image being cropped has a height being less than the cropping height H and a width being less than the cropping width W.

Step S206: the processing unit 10 executes an analysis of hairline features on the hair representation image (as the example shown in FIG. 8A) to obtain a hairline feature image (as the example shown in FIG. 8B). The above-mentioned hairline feature image may be used to emphasize a distribution and scope of the present hairlines.

One of the exemplary embodiments, the processing unit 10 may firstly execute a gray-scale process on the hair representation image to obtain the hair representation image being gray-scale, and then execute an analysis of hairline features on the hair representation image being gray-scale to obtain the hairline feature image being gray-scale.

One of the exemplary embodiments, the above-mentioned analysis of hairline features comprises analyzing hairline features by the Hessian Matrix. Analyzing line features by the Hessian Matrix is the common techniques in this technical field, the relevant description is omitted for brevity.

Step S207: the processing unit 10 executes a process of image morphology on the hairline feature image to obtain the hair mask.

One of the exemplary embodiments, the processing unit 10 may execute a binarization process of brightness division on the hairline feature image to obtain the hairline feature image being halftone (such as the example shown in FIG. 8C), and execute the process of image morphology on the hairline feature image being halftone (such as the white region shown in FIG. 8E), the above-mentioned hairline feature image being halftone is used to indicate a region matching with a designated brightness range in the hairline feature image.

One of the exemplary embodiments, the above-mentioned binarization process of brightness division is used to emphasize the image belonging to the partial brightness range in the hairline feature image (such as the image comprises pixels belonging to the brightness range of top 25%), and conceal the image belonging to the another brightness range in the hairline feature image. Take the hairline feature image being 8-bits gray-scale image for example, the above-mentioned binarization process of brightness division may configure the pixels which their pixel values are greater than 192 as the visualization pixels (such as being expressed by white pixels), and configure the pixels which their pixel values are not greater than 192 as the cover pixels (such as being expressed by black pixels). Namely, the above-mentioned binarization process of brightness division may configure the pixels belonging to the brightness range of top 25% as the visualization pixels, and configure the pixels of 25% remaining as the cover pixels.

One of the exemplary embodiments, the above-mentioned process of image morphology may comprise executing an erosion process and a dilation process on a plurality of adjacent pixels of the hairline feature image many times.

One of the exemplary embodiments, the above-mentioned process of image morphology is configured to firstly execute a closing operation on the hairline feature image to make edges of the hairline features smooth (such as the example shown in FIG. 8D), and then execute an opening operation on the hairline feature image being processed by closing operation to remove the hairline features being scattered (such as the example shown in FIG. 8E). Thus, the hair position indicated by the hair mask of the present disclosed example will be more correct.

Step S208: the processing unit 10 applies the hair mask to the hair representation image for obtaining the hair representation image excluding from non-hair image (such as the line region shown in FIG. 8F), and computes the hair color parameter according to values of a plurality of pixel of the hair representation image applied the hair mask.

One of the exemplary embodiments, the processing unit 10 computes a mean of pixel values of the above-mentioned pixels of the hair representation image being applied as the hair color parameter.

One of the exemplary embodiments, the processing unit 10 may select (randomly or by a default rule) a plurality of pixels, and execute a statistic analysis process (such as selecting the pixel values repeated the most times, a mean of pixel values belonging to top 15% of brightness range, and so on) according to the pixel values of the plurality of pixels to obtain the hair color parameter.

Step S209: the processing unit 10 retrieves the eyebrow mask corresponding to the original eyebrow image, the above-mentioned eyebrow mask is used to indicate a position and shape of the original eyebrow image in the head image (such as the mask 52 indicating the position and shape of the eyebrow image 520).

Step S210: the processing unit 10 executes a process of erasing or brushing eyebrows on the head image to erase or brush the original eyebrow image in the head image for obtaining a head image which the eyebrows have been erased or brushed (such as the head image 50 which the eyebrows have been erased or brushed as shown in FIG. 9).

The present disclosed example can eliminate or reduce color information of the original eyebrow image in the head image via erasing or brushing the original eyebrow image, and make the AR head image generated later look natural.

Step S211: the processing unit 10 executes a first color-mixing process on the head image being processed according to the hair color parameter (take the color block 51 of the hair color parameter for example in FIG. 9) and the eyebrow mask to color at an eyebrow position of the head image being processed to obtain the AR head image (as shown in FIG. 9, the color of the color block 51 of the hair color parameter has been applied to the eyebrow part in the AR head image 60).

One of the exemplary embodiments, the processing unit 10 may firstly execute a gradualness process on the eyebrow mask to smooth the contour of the eyebrow mask, and then execute the color-mixing process on the head image 50 which the eyebrows have been erased or brushed according to the color block 51 corresponding to the hair color parameter and the eyebrow mask being processed to obtain the AR head image. This embodiment can make the eyebrow contour of the AR head image being generated have less chromatic aberration and look more natural via the usage of the eyebrow mask having the smooth contour.

One of the exemplary embodiments, the first color-mixing process comprises computing a plurality of new pixel values of the plurality of pixels (namely the pixel values od the corresponding pixels of the AR head image) according to a first transparency amount (such as 0.9), the hair color parameter and a plurality of original pixel values of the plurality of pixels of the head image being processed corresponding to the eyebrow mask. More specifically, the first color-mixing process is configured to compute the new pixel values by following formula (1) to (3).

$$Y(x,y)=S1(x,y)*beta+S2(x,y)*alpha \quad (1)$$

$$alpha=Mask(x,y)*amount\_1 \quad (2)$$

$$beta=1-alpha \quad (3)$$

Wherein Y(x, y) represents the pixel value of the pixel located at position(x, y) of the AR head image; S1(x, y) represents the pixel value of the pixel located at position(x, y) of the head image which the eyebrows have been erased or brushed; S2(x, y) represents the pixel value of the pixel located at position(x, y) of the color block of the hair color parameter; both alpha and beta represent variables; Mask(x, y) represents the pixel value of the pixel located at position (x, y) of the eyebrow mask, the pixel values of the eyebrow mask are main used to indicate whether each position (x, y) belongs to the eyebrow; amount_1 represents a default first transparency amount (such as 0.5 or 0.9), the higher the value of the first transparency amount, the more obvious the coloring effect, vice versa.

Step S212: the processing unit 10 control the display module 11 to display the front mirror image, and display the AR head image simultaneously to cover the head image in the front mirror image, so as to make the displayed frame shown an electronic mirror image of the user which his/her hair color has been applied to his/her eyebrows.

Step S213: the processing unit 10 determines a color code corresponding to the hair color parameter, and display the color code by the display module. The above-mentioned color code may be the color code of brown pencil or the color code of dye. Thus, the user may select the suitable brown pencil or dye according to the displayed color code to apply the color to his/her true eyebrows if the user thinks that the simulated appearance which applying the color to his/her eyebrow meets the human's expectation.

One of the exemplary embodiments, the storage module 15 store a lookup table, the lookup table records the corresponding relationships between a plurality of hair color parameter (or range) and a plurality of color codes, the processing unit 10 searching in the lookup table according to the hair color parameter to obtain the corresponding color code.

Step S214: the processing unit 10 determines whether there is a need to recompute the AR head image.

If the processing unit 10 determines that there is a need to recompute the AR head image, the step S200 is performed again. Otherwise, the processing unit 10 finishes the execution of the display method of applying color.

Figure 5:
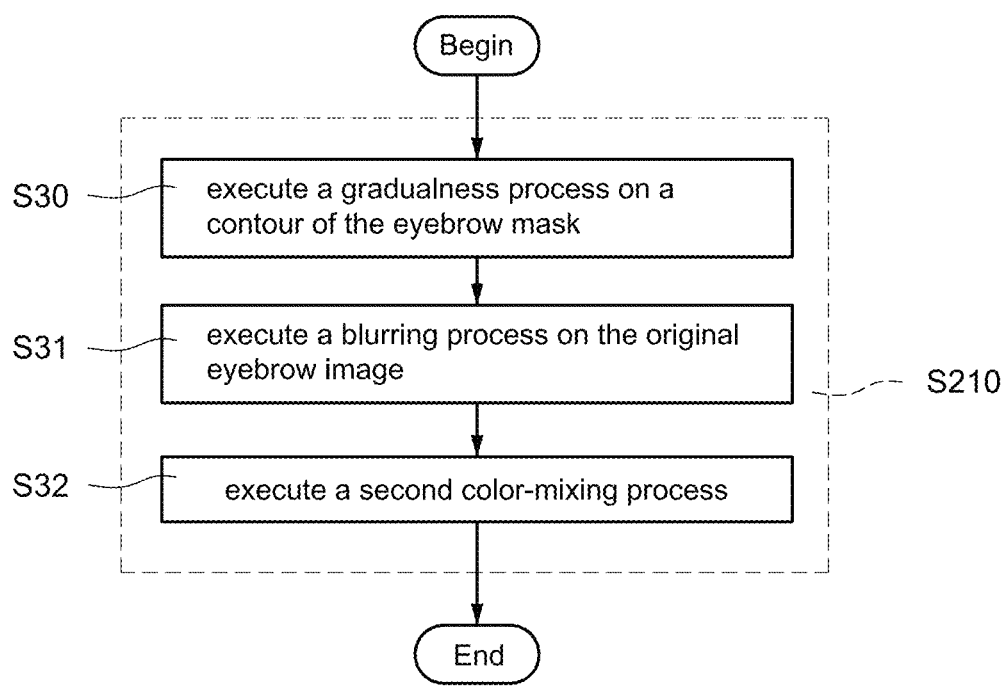
FIG. 5 is a flowchart of a process of erasing or brushing eyebrows of a third embodiment of the present disclosed example.
Figure 10:
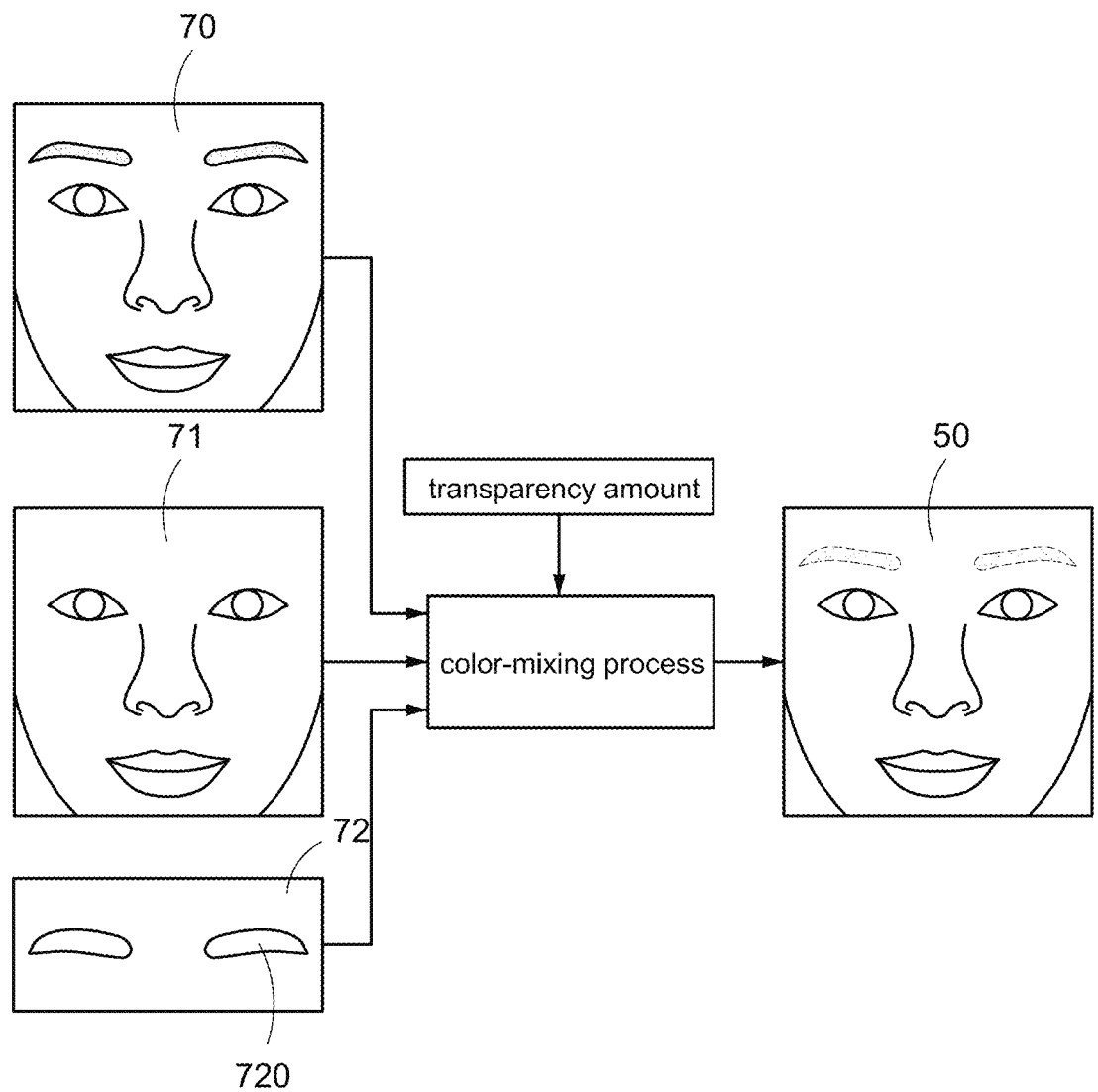
FIG. 10 is a schematic view of a second color-mixing process according to one embodiment of the present disclosed example.

Please refer to FIG. 4A, FIG. 4B, FIG. 5 and FIG. 10 together. FIG. 5 is a flowchart of a process of erasing or brushing eyebrows of a third embodiment of the present disclosed example, and FIG. 10 is a schematic view of a second color-mixing process according to one embodiment of the present disclosed example. This embodiment discloses a technology to generate a head image 50 which the eyebrows had been brushed. Compare to directly modify the color of an eyebrow image of the head image 50 or directly remove the eyebrow image from the head image 50, an eyebrow region of the head image 50 which the eyebrows had been brushed by this embodiment looks very natural, so as to make the effect of applying color to eyebrows of the AR head image being generated looks natural. Compare to the embodiment shown in FIG. 4A and FIG. 4B, the step S210 of the display method of applying color further comprises following steps for generating the head image 50 which the eyebrows had been brushed.

Step S30: the processing unit 10 executes a gradualness process on a contour of the eyebrow mask to smooth the contour of the eyebrow mask. As shown in FIG. 10, a contour of the eyebrow region 720 of the eyebrow mask 72 being processed is smooth.

When the eyebrow mask having the smooth contour provided by the present disclosed example is applied to the following process (such as the second color-mixing process), the contour region of the eyebrows will be processed in a way of gradualness, so as to make the image (such as the head image 50 which the eyebrows have been erased or brushed) look more natural.

Step S31: the processing unit 10 executes a blurring process on the original eyebrow image to obtain the blur eyebrow image. The above-mentioned blur eyebrow image is without obvious contour or obvious brown color and hard to recognize the eyebrows.

For example, as shown in FIG. 10, the processing unit 10 may execute a blurring process on the eyebrow image of the head image 70 to erase or brush the eyebrow image to obtaining the head image 71 which the eyebrows have been erased or brushed. Namely, the head image 71 comprises the blur eyebrow image.

One of the exemplary embodiments, the above-mentioned blurring process may comprise changing the color of the eyebrow image into a color of skin surrounding the eyebrows.

One of the exemplary embodiments, the above-mentioned blurring process may comprise low-pass filtering process, and have the ability to erase the details of the eyebrow image.

Step S32: the processing unit 10 f23) executes a second color-mixing process according to the original head image, the blur eyebrow image, the eyebrow mask to mix the eyebrow image in the original head image and the blur eyebrow image for erasing or brushing the original eyebrow image in the head image.

One of the exemplary embodiments, as shown in FIG. 10, the second color-mixing process comprises computing a plurality of new pixel values of the plurality of pixels of the head image 50 which the eyebrow image has been erased or brushed according to a second transparency amount (such as 0.5 or 0.8), a plurality of pixels values of a plurality of pixels of the head image 71 comprising the blur eyebrow image corresponding to the eyebrow mask 72, and a plurality of original pixels values of a plurality of pixels of the head image 70 corresponding to the eyebrow mask 72. More specifically, the second color-mixing process is configured to compute the pixel values of the head image 50 which the eyebrow has been erased or brushed. by following the formulas (4) to (6).

$$S1(x,y)=S3(x,y)*beta+S4(x,y)*alpha \quad (4)$$

$$alpha=Mask(x,y)*amount\_2 \quad (5)$$

$$beta=1-alpha \quad (6)$$

Wherein S1(x, y) represents the pixel value of the pixel located at position(x, y) of the head image which the eyebrows have been erased or brushed; S3(x, y) represents the pixel value of the pixel located at position(x, y) of the head image 70; S4(x, y) represents the pixel value of the pixel located at position(x, y) of the head image 71 comprising the blur eyebrow image; both alpha and beta represent variables; Mask(x, y) represents the pixel value of the pixel located at position(x, y) of the eyebrow mask 72, the pixel values of the eyebrow mask 72 are main used to indicate whether each position (x, y) belongs to the eyebrow; amount_2 represents a default second transparency amount (such as 0.5 or 0.8), the higher the value of the second transparency amount, the more obvious the effect of erasing or brushing the eyebrow, vice versa.

Thus, the present disclosed example can generate the head image 50 which the eyebrows have been erased or brushed, and the head image 50 looks more natural.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. An augmented reality display method of applying color of hair to eyebrows, the method being applied to a smart mirror apparatus (1) comprising an image capture module (12), a display module (11) and a processing unit (10), the method comprising following steps:
    a) capturing a head image (30) of a user (2) by the image capture module (12);
    b) cropping the head image (30) for obtaining an original eyebrow image by the processing unit (10);
    c) cropping the head image (30) for obtaining a hair representation image (31), wherein the hair representation image (31) only covers partial hair of the user (2);
    d) executing a process of extracting hair region on the hair representation image (31) for obtaining a hair mask, wherein the hair mask indicates a hair position of the hair in the hair representation image (31);
    e) computing a hair color parameter according to the hair mask and the hair representation image (31);
    f) executing a process of coloring eyebrows on the head image (30) according to the hair color parameter and a position of the original eyebrow image for obtaining an AR (Augmented Reality) head image, wherein an eyebrow color of the AR head image corresponds to the hair color parameter; and
    g) displaying the AR head image by the display module (11);
    wherein the step d) comprises following steps:
    d1) executing a gray-scale process on the hair representation image (31) to obtain the hair representation image (31) being gray-scale, and executing an analysis of hairline features on the hair representation image (31) being gray-scale to obtain a hairline feature image; and
    d2) executing a binarization process of brightness division on the hairline feature image to obtain the hairline feature image being halftone, and executing a process of image morphology on the hairline feature image being halftone to obtain the hair mask, wherein the hairline feature image being halftone is used to indicate a region matching with a designated brightness range in the hairline feature image.

2. The augmented reality display method of applying color of hair to eyebrows according to claim 1, further comprising a step h) performed after the step a) and before the step b) executing a face analysis process on the head image (30) to recognize a plurality of eyebrow feature points (40, 41) corresponding to eyebrows of the user (2);
    wherein the step b) is performed to crop the eyebrow image from the head image (30) according to the plurality of eyebrow feature points (40, 41).

3. The augmented reality display method of applying color of hair to eyebrows according to claim 2, wherein the step h) is further performed to recognize a plurality of forehead feature points (42-44) corresponding to a forehead of the user (2), the step c) comprises following steps:
    c1) determining a cropping width (W) according to the plurality of forehead feature points (42-44);
    c2) determining a cropping height (H) according to the forehead feature point (42-44) being the highest and a hair apex point; and
    c3) cropping a part of the head image (30) as the hair representation image (31) according to a position of the forehead feature point (42-44) being the highest, the cropping width (W) and the cropping height (H).

4. The augmented reality display method of applying color of hair to eyebrows according to claim 1, wherein the step e) is performed to apply the hair mask to the hair representation image (31) to obtain the hair representation image (31) excluding from non-hair image, and compute a mean of pixel values of a plurality of pixels of the hair representation image (31) being applied as the hair color parameter.

5. The augmented reality display method of applying color of hair to eyebrows according to claim 1, wherein the step f) further comprises following steps:
    f1) retrieving an eyebrow mask corresponding to the original eyebrow image, wherein the eyebrow mask is used to indicate a position and shape of the original eyebrow image in the head image (30);
    f2) executing a process of erasing or brushing eyebrows on the head image (30) to erase or conceal the original eyebrow image; and
    f3) executing a first color-mixing process on the head image (30) being processed according to the hair color parameter and the eyebrow mask to color at an eyebrow position of the head image (30) being processed to obtain the AR head image.

6. The augmented reality display method of applying color of hair to eyebrows according to claim 5, wherein the first color-mixing process comprises computing a plurality of new pixel values of the plurality of pixels of the head image (30) according to a first transparency amount, the hair color parameter and a plurality of original pixel values of the plurality of pixels of the head image (30) being processed corresponding to the eyebrow mask.

7. The augmented reality display method of applying color of hair to eyebrows according to claim 1, further comprising a step i) determining a color code corresponding to the hair color parameter, and display the color code by the display module (11).

8. An augmented reality display method of applying color of hair to eyebrows, the method being applied to a smart mirror apparatus (1) comprising an image capture module (12), a display module (11) and a processing unit (10), the method comprising following steps:

a) capturing a head image (30) of a user (2) by the image capture module (12);

b) cropping the head image (30) for obtaining an original eyebrow image by the processing unit (10);

c) cropping the head image (30) for obtaining a hair representation image (31), wherein the hair representation image (31) only covers partial hair of the user (2);

d) executing a process of extracting hair region on the hair representation image (31) for obtaining a hair mask, wherein the hair mask indicates a hair position of the hair in the hair representation image (31);

e) computing a hair color parameter according to the hair mask and the hair representation image (31);

f) executing a process of coloring eyebrows on the head image (30) according to the hair color parameter and a position of the original eyebrow image for obtaining an AR (Augmented Reality) head image, wherein an eyebrow color of the AR head image corresponds to the hair color parameter; and g) displaying the AR head image by the display module (11);

wherein the step d) comprises following steps:

d1) executing an analysis of hairline features on the hair representation image (31) to obtain a hairline feature image, wherein the analysis of hairline features comprises analyzing hairline features by Hessian matrix; and d2) execute a process of image morphology on the hairline feature image to obtain the hair mask, wherein the process of image morphology comprises executing an erosion process and a dilation process on a plurality of adjacent pixels of the hairline feature image at least two times.

9. The augmented reality display method of applying color of hair to eyebrows according to claim 8, further comprising a step h) performed after the step a) and before the step b) executing a face analysis process on the head image (30) to recognize a plurality of eyebrow feature points (40, 41) corresponding to eyebrows of the user (2);

wherein the step b) is performed to crop the eyebrow image from the head image (30) according to the plurality of eyebrow feature points (40, 41).

10. The augmented reality display method of applying color of hair to eyebrows according to claim 9, wherein the step h) is further performed to recognize a plurality of forehead feature points (42-44) corresponding to a forehead of the user (2), the step c) comprises following steps:

c1) determining a cropping width (W) according to the plurality of forehead feature points (42-44);

c2) determining a cropping height (H) according to the forehead feature point (42-44) being the highest and a hair apex point; and c3) cropping a part of the head image (30) as the hair representation image (31) according to a position of the forehead feature point (42-44) being the highest, the cropping width (W) and the cropping height (H).

11. The augmented reality display method of applying color of hair to eyebrows according to claim 8, wherein the process of image morphology is configured to firstly execute a closing operation on the hairline feature image to make edges of the hairline features smooth, and then execute an opening operation on the hairline feature image being processed to remove the hairline features being scattered.

12. The augmented reality display method of applying color of hair to eyebrows according to claim 8, wherein the step e) is performed to apply the hair mask to the hair representation image (31) to obtain the hair representation image (31) excluding from non-hair image, and compute a mean of pixel values of a plurality of pixels of the hair representation image (31) being applied as the hair color parameter.

13. The augmented reality display method of applying color of hair to eyebrows according to claim 8, further comprising a step i) determining a color code corresponding to the hair color parameter, and display the color code by the display module (11).

14. An augmented reality display method of applying color of hair to eyebrows, the method being applied to a smart mirror apparatus (1) comprising an image capture module (12), a display module (11) and a processing unit (10), the method comprising following steps:

a) capturing a head image (30) of a user (2) by the image capture module (12);

b) cropping the head image (30) for obtaining an original eyebrow image by the processing unit (10);

c) cropping the head image (30) for obtaining a hair representation image (31), wherein the hair representation image (31) only covers partial hair of the user (2);

d) executing a process of extracting hair region on the hair representation image (31) for obtaining a hair mask, wherein the hair mask indicates a hair position of the hair in the hair representation image (31);

e) computing a hair color parameter according to the hair mask and the hair representation image (31);

f) executing a process of coloring eyebrows on the head image (30) according to the hair color parameter and a position of the original eyebrow image for obtaining an AR (Augmented Reality) head image, wherein an eyebrow color of the AR head image corresponds to the hair color parameter; and g) displaying the AR head image by the display module (11);

wherein the step f) further comprises following steps:

f1) retrieving an eyebrow mask corresponding to the original eyebrow image, wherein the eyebrow mask is used to indicate a position and shape of the original eyebrow image in the head image (30);

f2) executing a process of erasing or brushing eyebrows on the head image (30) to erase or conceal the original eyebrow image; and f3) executing a first color-mixing process on the head image (30) being processed according to the hair color parameter and the eyebrow mask to color at an eyebrow position of the head image (30) being processed to obtain the AR head image;

wherein the step f2) comprises following steps:

f21) executing a gradualness process on contour of the eyebrow mask to blur the contour of the eyebrow mask;

f22) executing a blurring process on the original eyebrow image to obtain a blur eyebrow image; and f23) executing a second color-mixing process according to the head image (30), the blur eyebrow image and the eyebrow mask to erase or conceal the original eyebrow image.

15. The augmented reality display method of applying color of hair to eyebrows according to claim 14, further comprising a step h) performed after the step a) and before the step b) executing a face analysis process on the head image (30) to recognize a plurality of eyebrow feature points (40, 41) corresponding to eyebrows of the user (2);

wherein the step b) is performed to crop the eyebrow image from the head image (30) according to the plurality of eyebrow feature points (40, 41).

16. The augmented reality display method of applying color of hair to eyebrows according to claim 15, wherein the step h) is further performed to recognize a plurality of forehead feature points (42-44) corresponding to a forehead of the user (2), the step c) comprises following steps:
- c1) determining a cropping width (W) according to the plurality of forehead feature points (42-44);
- c2) determining a cropping height (H) according to the forehead feature point (42-44) being the highest and a hair apex point; and
- c3) cropping a part of the head image (30) as the hair representation image (31) according to a position of the forehead feature point (42-44) being the highest, the cropping width (W) and the cropping height (H).

17. The augmented reality display method of applying color of hair to eyebrows according to claim 14, wherein the step e) is performed to apply the hair mask to the hair representation image (31) to obtain the hair representation image (31) excluding from non-hair image, and compute a mean of pixel values of a plurality of pixels of the hair representation image (31) being applied as the hair color parameter.

18. The augmented reality display method of applying color of hair to eyebrows according to claim 14, wherein the first color-mixing process comprises computing a plurality of new pixel values of the plurality of pixels of the head image (30) according to a first transparency amount, the hair color parameter and a plurality of original pixel values of the plurality of pixels of the head image (30) being processed corresponding to the eyebrow mask.

19. The augmented reality display method of applying color of hair to eyebrows according to claim 14, wherein the second color-mixing process comprises computing a plurality of new pixel values of the plurality of pixels of the head image (30) according to a second transparency amount, a plurality of pixels values of a plurality of pixels of the blur eyebrow image corresponding to the eyebrow mask, and a plurality of original pixels values of a plurality of pixels of the head image (30).

20. The augmented reality display method of applying color of hair to eyebrows according to claim 14, further comprising a step i) determining a color code corresponding to the hair color parameter, and display the color code by the display module (11).

* * * * *